United States Patent
Aske et al.

(10) Patent No.: US 11,084,123 B2
(45) Date of Patent: Aug. 10, 2021

(54) LASER-ETCHING AND MACHINE-VISION POSITIONING SYSTEM

(71) Applicant: THE BOEING COMPANY, Chicago, IL (US)

(72) Inventors: James Alan Aske, Charleston, SC (US); Tyler Emerson Berkey, Charleston, SC (US); John Eric Miller, Wadmalaw Island, SC (US)

(73) Assignee: The Boeing Company, Chicago, IL (US)

(*) Notice: Subject to any disclaimer, the term of this patent is extended or adjusted under 35 U.S.C. 154(b) by 176 days.

(21) Appl. No.: 16/562,387

(22) Filed: Sep. 5, 2019

(65) Prior Publication Data
US 2021/0069825 A1    Mar. 11, 2021

(51) Int. Cl.
| | |
|---|---|
| *B23K 26/082* | (2014.01) |
| *B23K 26/00* | (2014.01) |
| *B23K 26/046* | (2014.01) |
| *B23K 26/362* | (2014.01) |
| B23K 26/042 | (2014.01) |

(52) U.S. Cl.
CPC .......... *B23K 26/046* (2013.01); *B23K 26/082* (2015.10); *B23K 26/362* (2013.01); *B23K 26/042* (2015.10)

(58) Field of Classification Search
CPC ... B23K 36/082; B23K 26/362; B23K 26/046
See application file for complete search history.

(56) References Cited

U.S. PATENT DOCUMENTS

| | | | | |
|---|---|---|---|---|
| 5,832,415 | A * | 11/1998 | Wilkening | B23K 26/042 |
| | | | | 702/86 |
| 9,321,126 | B2 * | 4/2016 | Xu | B23K 26/00 |
| 2003/0218667 | A1 * | 11/2003 | Williams | H04N 1/06 |
| | | | | 347/169 |
| 2004/0031779 | A1 * | 2/2004 | Cahill | B23K 26/40 |
| | | | | 219/121.83 |
| 2005/0104952 | A1 * | 5/2005 | Haushahn | H04N 1/00031 |
| | | | | 347/224 |

(Continued)

FOREIGN PATENT DOCUMENTS

| | | | | |
|---|---|---|---|---|
| CN | 105479010 | B * | 6/2017 | |
| DE | 102006002971 | A1 * | 8/2006 | .......... H04N 1/1912 |

OTHER PUBLICATIONS

STIC Search Report—U.S. Appl. No. 16/562,387 (Year: 2021).*

*Primary Examiner* — Robert J Utama
*Assistant Examiner* — Lawrence H Samuels
(74) *Attorney, Agent, or Firm* — Womble Bond Dickinson (US) LLP

(57) ABSTRACT

Systems, methods and computer program products for laser etching and robotic machining of large workpieces are disclosed. An example system includes a first ring of lasers configured to etch longitudinal gridlines on a workpiece, a second ring of lasers configured to etch circumferential gridlines on the workpiece, where the longitudinal gridlines and the circumferential gridlines define a working grid on the workpiece, and a machine vision system to scan the working grid and compare the working grid to a reference grid in a computer model of the workpiece and to determine offsets between the working grid and the reference grid for positioning a robotic machining tool.

20 Claims, 9 Drawing Sheets

(56) References Cited

U.S. PATENT DOCUMENTS

2008/0032066 A1* 2/2008 Stiblert .............. G03F 7/70391
427/595
2020/0027722 A1* 1/2020 Nakagawa ........ H01L 21/02691

* cited by examiner

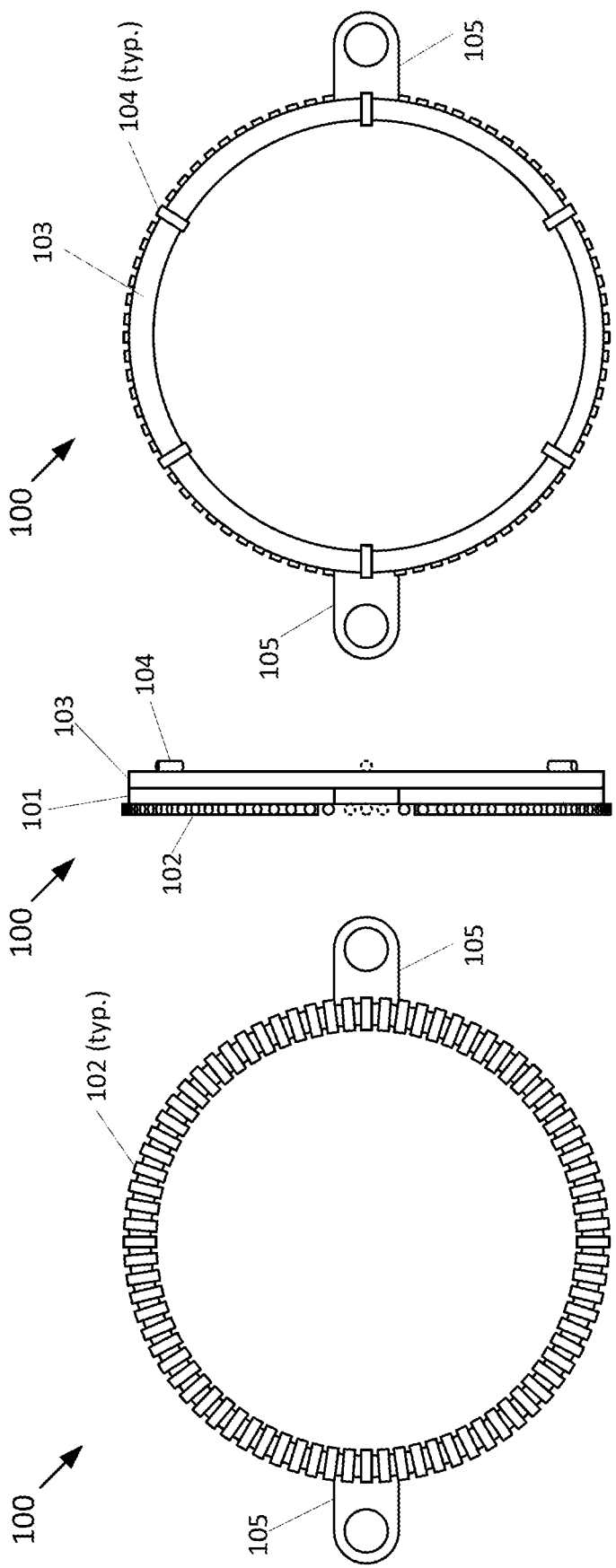

SECTION B-B

SECTION A-A

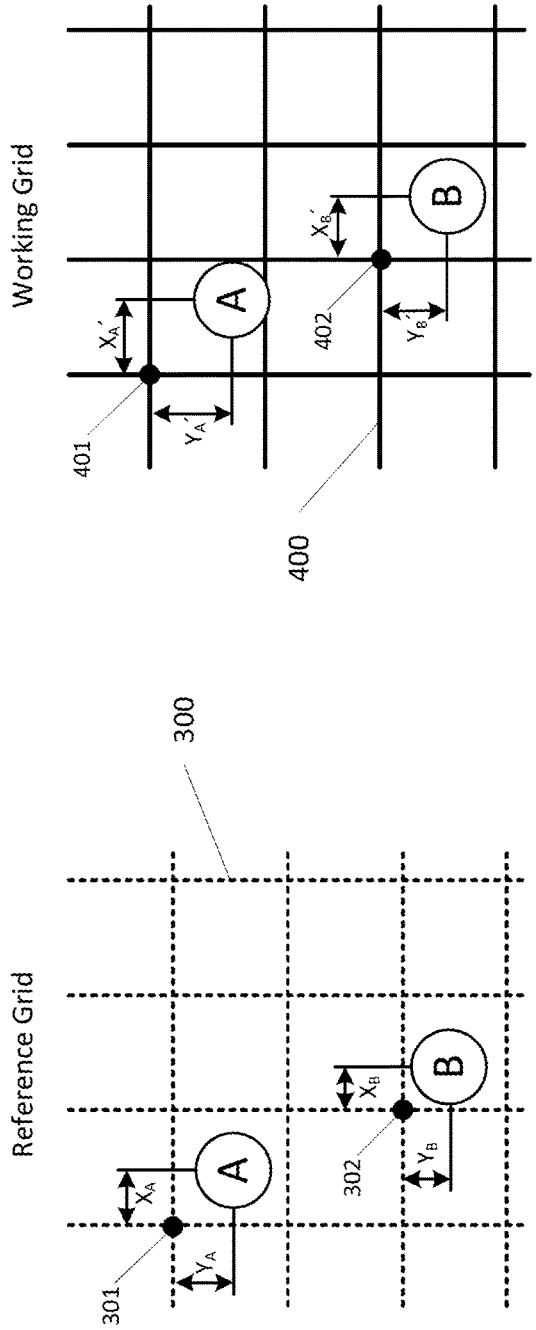
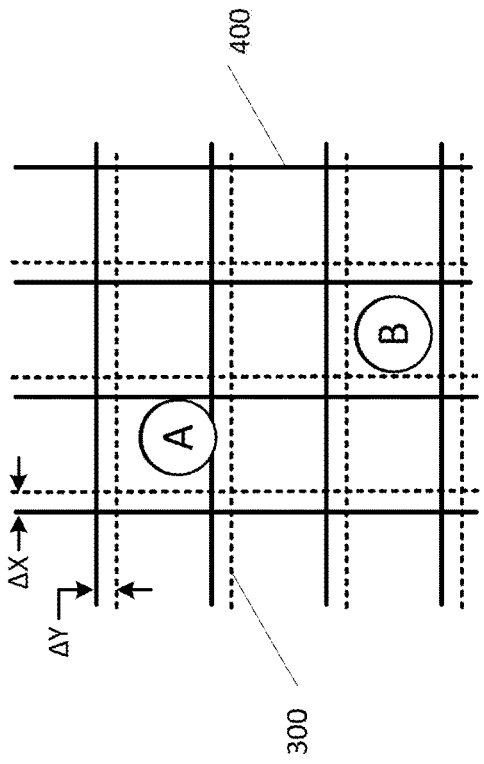
FIG. 11
FIG. 12
FIG. 13
$X_A' = X_A + \Delta X \quad Y_A' = Y_A + \Delta Y \quad X_B' = X_B + \Delta X \quad Y_B' = Y_B + \Delta Y$

LASER-ETCHING AND MACHINE-VISION POSITIONING SYSTEM

FIELD

The present disclosure is related to large-scale manufacturing systems in general, and more particularly to improving the precision of robotic machining operations on large workpieces.

BACKGROUND

In large-scale manufacturing and assembly environments, such as aircraft manufacturing, shipbuilding, and automotive manufacturing, robots must locate absolute target points on a large object using a nominal (i.e., computer-modeled) three-dimensional coordinate system, with an origin tied to a feature of the workpiece. At target points far from the origin, accumulated errors due to backlash, variance and repeatability of the robot arms can introduce significant errors.

SUMMARY

Examples in the present disclosure include systems and methods for etching a coordinate grid directly on a workpiece, and using a computer vision system to relate the etched grid to a nominal grid in a computer model of the workpiece. The robot can then locate an individual grid element (e.g., a node) with precision, and find a precise location within that cell to perform an operation, such as drilling a hole.

Examples in the present disclosure describe systems and methods in aircraft manufacturing for clarity and to avoid unnecessary complication in the description. However, the scope of the present disclosure is not so limited, and the systems and methods described herein are equally applicable to other large-scale manufacturing such as shipbuilding, automotive manufacturing, and the like.

In one example, a system for laser etching a large workpiece includes a first ring of lasers configured to etch longitudinal gridlines on the workpiece. The system includes a second ring of lasers configured to etch circumferential gridlines on the workpiece, where the longitudinal gridlines and the circumferential gridlines define a working grid on the workpiece. The system also includes a machine vision system to compare the working grid to a reference grid in a computer model of the workpiece and to determine offsets between the working grid and the reference grid.

In one example, each laser in the first ring of lasers and the second ring of lasers includes a distance sensing and focusing system to focus each laser on the workpiece. In one example, the system also includes a rail system to support and position the first and second rings of lasers (collectively, the laser gantry) with respect to the workpiece, and a robotic drive system coupled with the laser gantry and the machine vision system to move the laser gantry across the workpiece and to rotate the second ring of lasers around the workpiece.

In one example, a method for laser etching a large workpiece includes etching longitudinal gridlines on a workpiece with a first ring of lasers. The method also includes etching circumferential gridlines on the workpiece with a second ring of lasers, where the longitudinal gridlines and the circumferential gridlines define a working grid on the workpiece. The method also includes comparing the working grid to a reference grid in a computer model of the workpiece, with a machine-vision system, and determining offsets between the working grid and the reference grid.

In one example, the method also includes detecting a distance between the workpiece and each laser in the laser gantry with a distance measuring system, and focusing each laser in the laser gantry on the workpiece.

In one example, etching the longitudinal gridlines on the workpiece includes traversing the workpiece with the first ring of lasers on a rail system with a robotic drive, and etching the circumferential gridlines on the workpiece includes rotating the second ring of lasers around the workpiece with the robotic drive.

In one example, a non-transitory computer-readable medium with instructions therein that, when executed by a processor in a system for laser etching, such as the system examples described above, causes the processor to initiate and/or control operations for laser etching such as the operations in the example methods described above.

Clause 1: A system comprising a first ring of lasers, comprising a first plurality of lasers, configured to etch longitudinal gridlines on a workpiece; a second ring of lasers, comprising a second plurality of lasers, configured to etch circumferential gridlines on the workpiece, wherein the longitudinal gridlines and the circumferential gridlines define a working grid on the workpiece; and a machine vision system to scan the working grid and compare the working grid to a reference grid in a computer model of the workpiece, and to determine offsets between the working grid and the reference grid.

Clause 2: The system of Clause 1, wherein each of the first plurality of lasers and each of the second plurality of lasers comprises a distance sensing and focusing system to focus each laser on the workpiece.

Clause 3: The system of Clause 1 or 2, further comprising a rail system to support and position the first ring of lasers and the second ring of lasers with respect to the workpiece.

Clause 4: The system of any of Clauses 1-3, wherein the second ring of lasers is configured to rotate with respect to the first ring of lasers and with respect to the workpiece, to etch the circumferential gridlines.

Clause 5: The system of any of Clauses 1-4, wherein an origin of the working grid is indexed to a datum of the workpiece.

Clause 6: The system of any of Clauses 1-5, wherein an origin of the working grid is indexed to the reference grid.

Clause 7: The system of any of Clauses 1-6, further comprising a robotic drive system coupled with the machine vision system and the rail system to translate the first ring of lasers and the second ring of lasers with respect to the workpiece, and to rotate the second ring of lasers with respect to the first ring of lasers and the workpiece.

Clause 8: The system of any of Clauses 1-7, further comprising a robotic tool coupled with the machine vision system, to perform machining operations on the workpiece based on the offsets between the working grid and the reference grid.

Clause 9: The system of any of Clauses 1-8, further comprising a gantry to support the workpiece and the rail system.

Clause 10: The system of any of Clauses 1-9, wherein the working grid comprises a plurality of grid cells, wherein the second ring of lasers and the robotic drive are configured to etch a location code in each of the plurality of grid cells.

Clause 11: A method comprising etching longitudinal gridlines on a workpiece with a first ring of lasers comprising a first plurality of lasers; etching circumferential gridlines on the workpiece with a second ring of lasers comprising a second plurality of lasers, wherein the longitudinal gridlines and the circumferential gridlines define a working grid on the workpiece; scanning the working grid with a machine-vision system; comparing the working grid to a reference grid in a computer model of the workpiece; and determining offsets between the working grid and the reference grid.

Clause 12: The method of Clause 11, further comprising detecting a distance between the workpiece and each laser in the first ring of lasers and the second ring of lasers and focusing each laser in the first ring of lasers and the second ring of lasers on the workpiece.

Clause 13: The method of Clause 11 or 12, wherein etching the longitudinal gridlines comprises traversing the workpiece with the first ring of lasers on a rail system with a robotic drive, and wherein etching the circumferential gridlines comprises rotating the second ring of lasers around the workpiece with the robotic drive.

Clause 14: The method of any of Clauses 11-13, further comprising indexing the working grid to the reference grid.

Clause 15: The method of any of Clauses 11-14, further comprising indexing the working grid to a datum of the workpiece.

Clause 16: The method of any of Clauses 11-15, comprising positioning a robotic tool at a node of the working grid with the machine-vision system; correcting the position of the robotic tool for the offsets between the working grid and the reference grid; and machining the workpiece at the corrected position of the robotic tool.

Clause 17: The method of any of Clauses 11-16, wherein the working grid comprises a plurality of grid cells, the method further comprising positioning the second ring of lasers with the machine vision system and the robotic drive and etching a location code in each of the plurality of grid cells with the second ring of lasers.

Clause 18: The method of any of Clauses 11-17 further comprising reading the location code of a selected grid cell with the machine vision system; positioning a robotic tool in the selected grid cell; correcting the positioning of the robotic tool for the offsets between the working grid and the reference grid; and machining the workpiece at the corrected position of the robotic tool.

Clause 19: An apparatus, comprising a non-transitory, computer-readable medium having instructions therein that, when executed by a processor in a laser etching system, cause the processor to control operations, comprising etching longitudinal gridlines on a workpiece comprising one of a cylindrical or semi-cylindrical body with a first ring of lasers comprising a first plurality of lasers; etching circumferential gridlines on the workpiece with a second ring of lasers comprising a second plurality of lasers, wherein the longitudinal gridlines and the circumferential gridlines define a working grid on the workpiece; scanning the working grid with a machine vision system; comparing the working grid to a reference grid in a computer model of the workpiece; and determining offsets between the working grid and the reference grid.

Clause 20: The apparatus of Clause 19, further comprising positioning a robotic tool at a node of the working grid with the machine-vision system; correcting the position of the robotic tool for the offsets between the working grid and the reference grid; and machining the workpiece at the corrected position of the robotic tool.

The foregoing examples can be achieved independently or be combined in yet other examples, further details of which can be seen with reference to the following description and drawings.

BRIEF DESCRIPTION OF THE DRAWINGS

For a more complete understanding of various examples, reference is now made to the following detailed description taken in connection with the accompanying drawings in which like identifiers correspond to like elements:

FIGS. 1-3 illustrate a three views of an example laser gantry according to the present disclosure;

FIGS. 11-13 illustrate an example of correcting for offsets between a working grid and a reference grid;

DETAILED DESCRIPTION

Figure 6:
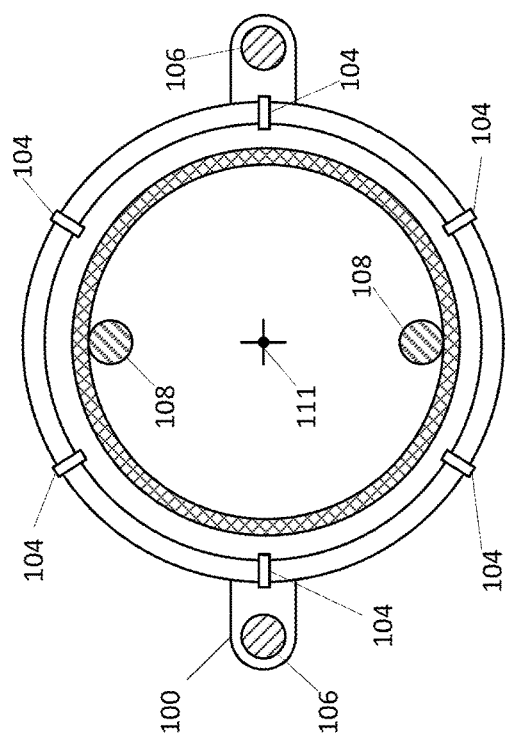
FIG. 6 is a second sectional view of FIG. 4.

The present disclosure describes examples of systems, methods and computer program products for laser etching a grid on a large workpiece to increase the precision of subsequent robotic machining operations. The systems include a motorized laser gantry with a stationary ring of lasers to etch longitudinal gridlines on the workpiece, and a rotatable ring of lasers to etch circumferential gridlines on the workpiece, a rail system to support the laser gantry, a machine vision system to compare the resulting working grid with a reference grid in a model of the workpiece and to direct the machining operations of a robotic tool on the workpiece.

FIGS. 1, 2 and 3 illustrate, respectively, front side and rear views of an example laser gantry 100 according to the present disclosure. Laser gantry 100 includes a first, stationary, ring 101 with a first plurality of lasers 102 attached, where the numbers of lasers 102 is determined by the size of the workpiece and the desired spacing of the gridlines to be etched on the workpiece. Laser gantry 100 also includes a second ring 103, with a second plurality of lasers 104 attached, which is configured to rotate with respect to ring 101. In one example, ring 103 may be mounted in a track of ring 101 with bearings (not shown) to enable free rotation of ring 103. In one example, laser gantry 100 also includes extensions 105, attached to ring 101, which are configured to engage a supporting rail system as discussed below.

Figure 5:
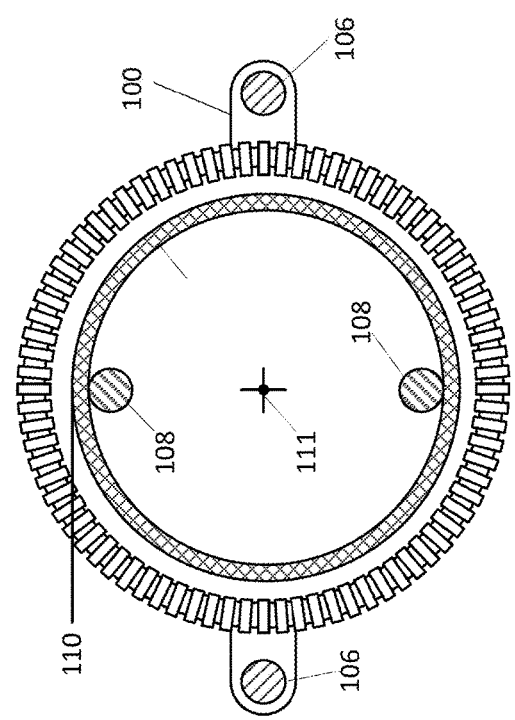
FIG. 5 is a first sectional view of FIG. 4.
Figure 4:
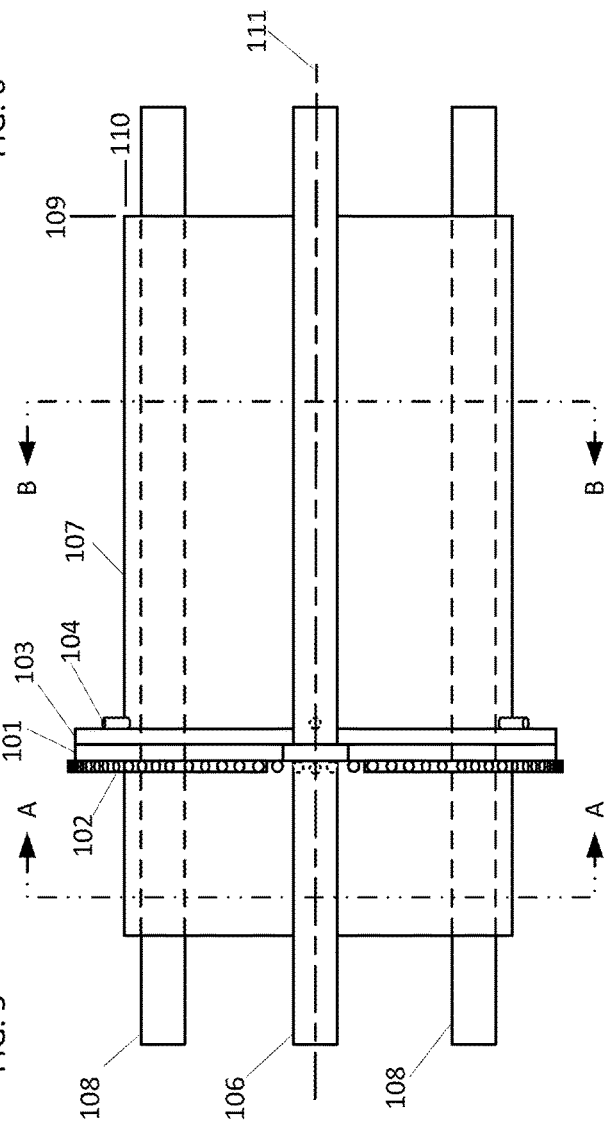
FIG. 4 illustrates an example of a rail-mounted laser gantry around a workpiece.

FIG. 4 illustrates laser gantry 100 supported by rails 106 around a workpiece 107, and FIGS. 5 and 6 illustrate, respectively, sections A-A and B-B of FIG. 4. In one example, workpiece 107 may be supported by another set of rails 108, or by any other means that does not impede the movement of laser gantry 100. Rails 106 and 108 may in turn be supported by members of a larger gantry structure (not shown). As described in greater detail below, laser gantry 100 is configured to move longitudinally across the surface of workpiece 107 while lasers 102 etch longitudinal gridlines on the surface of workpiece 107. In one example, at each position on the workpiece 107 where a circumferential gridline is required, the laser gantry 100 stops and the lasers 102 are turned off. Then lasers 104 are turned on while ring 103 rotates with respect to ring 101 and the workpiece 107 to etch a circumferential gridline. In the example of FIG. 6, there are six lasers 104 on ring 103, such that ring 103 needs to be rotated 60 degrees to etch a 360 degree gridline around workpiece 107. In other examples, more than six lasers 104 or fewer than six lasers 104 may be used as a matter of design choice. For example, more lasers 104 may be used to reduce the amount of rotation of ring 103 needed to etch a circumferential gridline, such that the overall etching time is reduced. Fewer lasers 104 may be used, for example, to reduce cost or thermal load on ring 103. Alternatively, in one example, laser gantry 100 may be translated across the entire length of workpiece 107 without stopping, such that the longitudinal gridlines are etched in one non-stop operation. Then, the lasers 102 can be turned off while the circumferential gridlines are etched one-by-one while the laser gantry 100 is stepped back to its staring position. In another example, the laser gantry 100 may move continuously across the entire length of workpiece 107 while ring 103 rotates continuously so that each laser 104 etches a spiral on the workpiece 107.

In one example, to insure that the lasers 102 and 104 are properly focused on the workpiece, each laser 102 and 104 is equipped with a self-contained distance sensing and focusing system (not shown) to focus each laser on the workpiece.

As described in greater detail below, the movement and positioning of laser gantry 100 may be controlled by a machine-vision/robotic-control system that indexes the locations of lasers 102 and lasers 104 to a reference point that serves as the origin of a coordinate system. In one example, the reference point may be a physical point (i.e., datum) on the workpiece 107 corresponding to some recognizable feature such as the intersection of an end line 109 and a topline 110 as illustrated in the example of FIGS. 4-6. Such a point may serve as the origin for any convenient coordinate system, such as a Cartesian coordinate system, for example. Other coordinate systems may be used, depending on the shape of the workpiece or a standard in the industry in which the manufacturing occurs. For example, if the workpiece has circular symmetry, such as the example workpiece 107, a cylindrical coordinate system with an origin at the axis of symmetry of the workpiece, such as axis 111 in FIGS. 4-6, could provide the most convenient coordinate system. An example of an industry specific coordinate system is the aircraft industry, where locations in a cylindrical or conical fuselage section are referenced from a station line, butt line, and waterline origin. In one example, the reference point may be a point in a reference grid (nominal grid) in a computer model of the workpiece that is independent of the physical location of the workpiece. In either scenario, based on the positioning of the workpiece, offsets may exist between the reference grid in the computer model and the working grid on the workpiece, requiring corrections as described in greater detail below.

Figure 8:
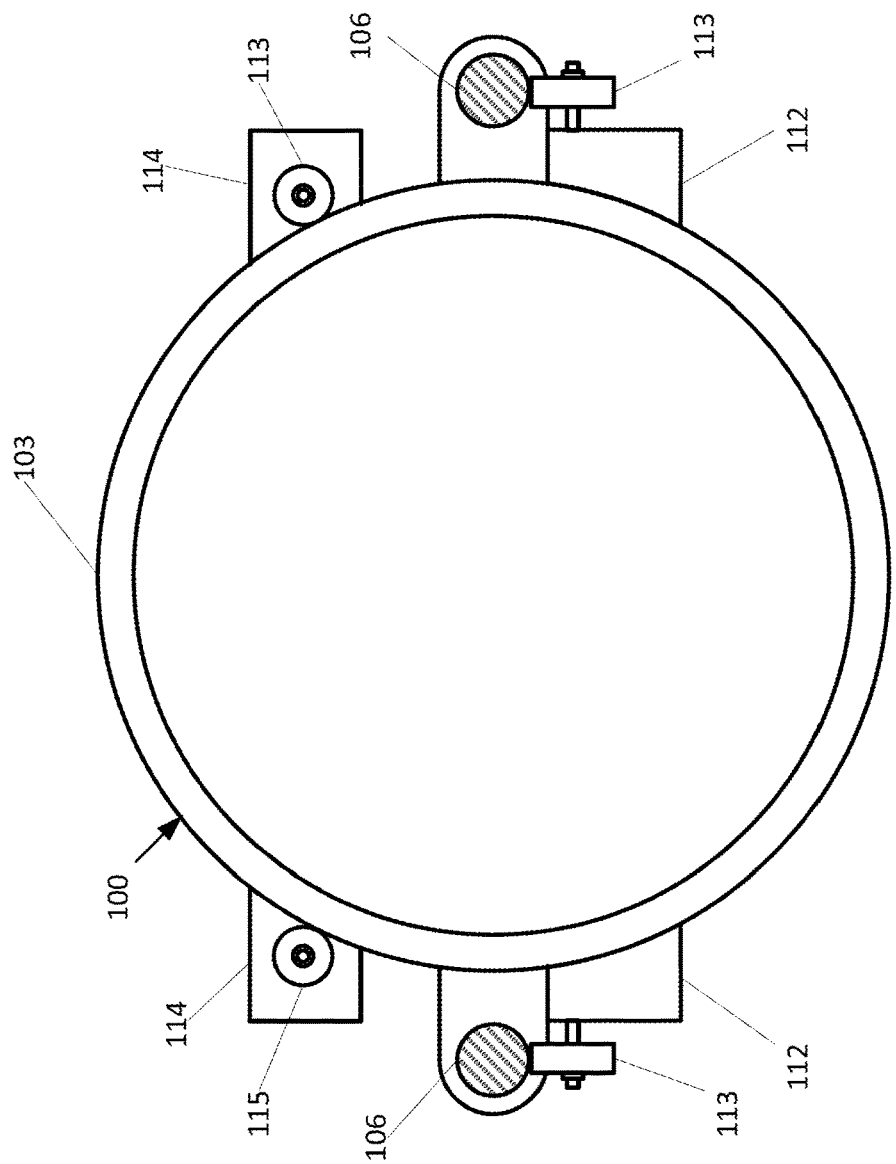
FIG. 8 illustrates an end view of an example motorized laser gantry.
Figure 7:
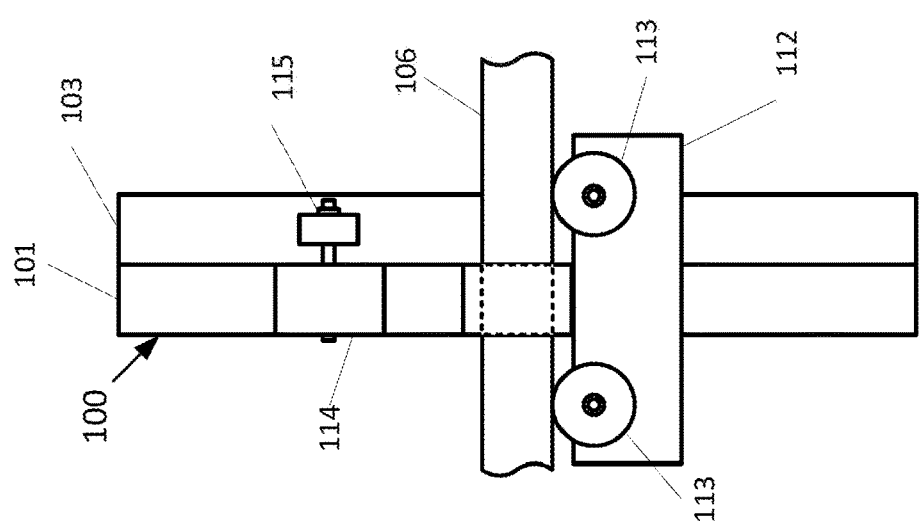
FIG. 7 illustrates a side view of an example motorized laser gantry.

In one example, the movement of the laser gantry 100 across the workpiece 107, and the rotation of the laser ring 103, may be controlled by servo-motors mounted on laser gantry 100 as illustrated in FIGS. 7 and 8, showing side and end views, respectively, of laser gantry 100 mounted on rails 106. In FIGS. 7 and 8, servo-motors 112 are mounted on ring 101, and are coupled to rails 106 by drive wheels 113 to move laser gantry 100 longitudinally across the workpiece. Also illustrated in FIGS. 7 and 8 are servo-motors 114 mounted on ring 101, and coupled to ring 103 by drive wheels 115 to rotate ring 103 around the workpiece.

Figure 9B:
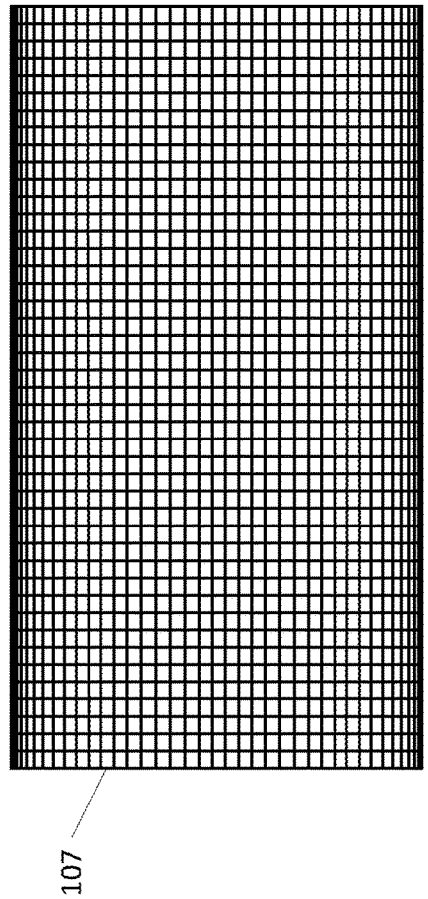
FIG. 9B illustrates an example of a workpiece with a rectilinear grid.
Figure 9C:
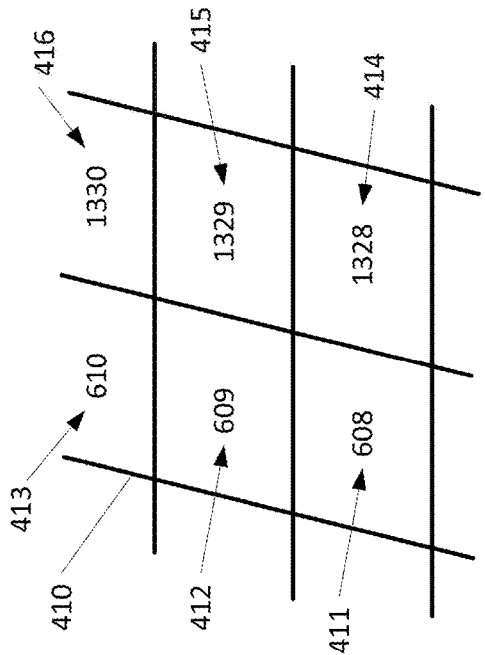
FIG. 9C illustrates an example of a laser etched spiral working grid with etched location codes.
Figure 9A:
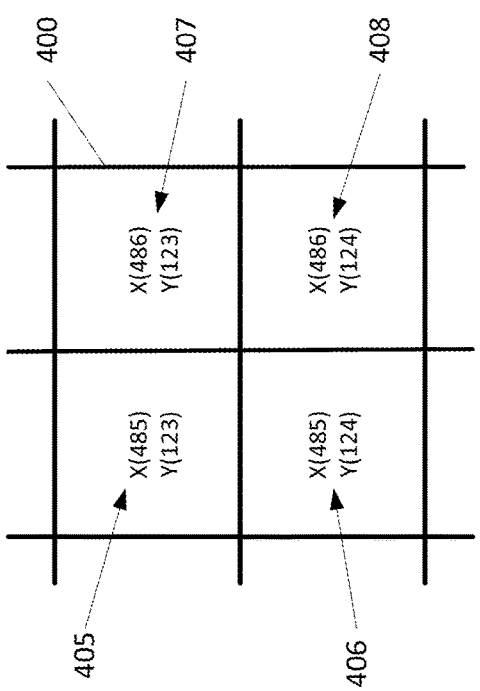
FIG. 9A illustrates an example of a laser etched rectangular working grid with etched location codes.
Figure 9D:
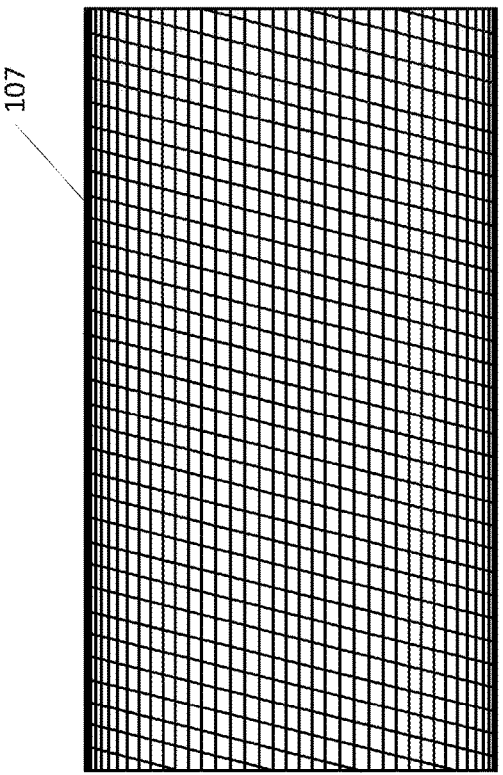
FIG. 9D illustrates an example of a workpiece with a spiral grid.

In one example, the laser gantry 100 and ring 103 with lasers 104 (not shown in FIGS. 7 and 8) may be used with the servo-motors to etch location codes into each cell in the grid while the grid is being etched, or after the grid is completed. FIG. 9A illustrates a portion of a working grid 400 of a rectilinear grid on workpiece 107, as illustrated in FIG. 9B, where each cell in the grid is a rectangle. The location codes may be the X and Y coordinates of the cells in the grid, such as codes 405-407, for example, which the machine vision system can use to identify the location of each cell in the reference grid. In other examples, the codes may be sequential numbers, bar codes, QR codes, or any other convenient code. FIG. 9C illustrates a portion of a working grid 410 of a spiral grid on workpiece 107, as illustrated in FIG. 9D, where each cell in the grid is a trapezoid. In the example of FIG. 9C, the cells are numbered sequentially along the spiral, but other numbering or notation could be used as already described.

Figure 10:
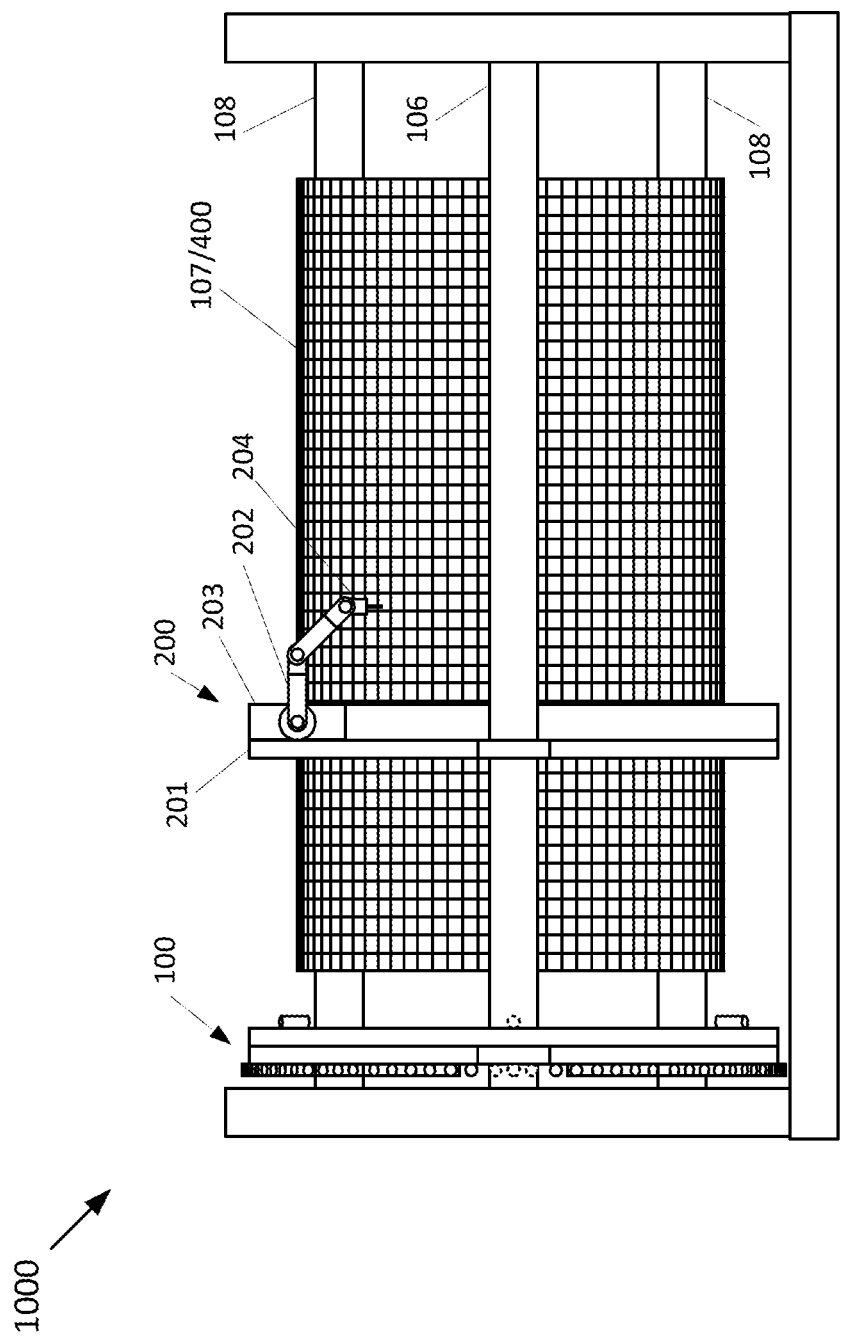
FIG. 10 illustrates an example of a complete gantry system for laser-etching a robotic machining.

After the working grid is etched, laser gantry 100 can be moved off of the workpiece 107 and replaced by a robot gantry 200 mounted on rails 106 as illustrated in FIG. 10. FIG. 10 illustrates a complete gantry system 1000 including laser gantry 100 and a robot gantry 200, supporting the workpiece 107 with etched working grid 400. In one example, robot gantry 200 includes a fixed ring 201 similar to ring 101 of laser gantry 100. Robot gantry also includes a rotatable ring 203 similar to ring 103 in laser gantry 100. Additionally, in one example, robot gantry 200 includes a robot arm 202 mounted on ring 203. Robot arm 202 may include cameras and/or scanners in a machine vision system to scan and capture the working grid on the workpiece 107, and a tool head 204 to perform machining operations on workpiece 107. In other examples, the grid may be scanned with a vision system separate from the gantry system 1000.

Once the workpiece 107 is scanned by robot gantry 200 (or a separate vision system) and the working grid is captured, the machine vision system can compare the working grid to the reference, or nominal, grid in the computer model of the workpiece to determine offsets between the working grid and the reference grid. FIG. 11 illustrates a portion of a reference grid 300 in a computer model of the workpiece, showing the locations of two features A and B (e.g., holes) to be machined into the workpiece, relative to nodes 301 and 302 in the reference grid 300. Feature A has offsets $X_A$ and $Y_A$ from reference node 301, and feature B has offsets $X_B$ and $Y_B$ from reference node 302. The machine vision system overlays the captured working grid 400 onto the reference grid to determine offsets $\Delta X$ and $\Delta Y$ between reference grid 300 and working grid 400. For simplicity, the offsets $\Delta X$ and $\Delta Y$ are illustrated as uniform throughout the grid. In general, though, each cell in the grid may have its own offsets depending on the precision of the etching process.

Once the offsets $\Delta X$ and $\Delta Y$ are determined, the machine vision system can correctly locate the features A and B relative to the working grid 400 as illustrated in FIG. 13.

Knowing the offsets ΔX and ΔY for a particular cell, the machine vision system can compute corrected offsets for the working grid as follows:

$$X_A'=X_A+\Delta X \quad (1)$$

$$Y_A'=Y_A+\Delta Y \quad (2)$$

$$X_B'=X_B+\Delta X \quad (3)$$

$$Y_B'=Y_B+\Delta Y \quad (4)$$

Then, for each feature to be machined on the workpiece, the machine vision system positions the tool head (e.g., tool 204) over the node in the working grid 400 corresponding to the same node in the reference grid 300, and then moves by the corrected offsets and performs the machining operation. In the example of FIG. 13, the tool head would first be moved to node 401, and then moved $X_A'$ in the x direction and $Y_A'$ in the y direction to locate the position of feature A. Then, the tool head would be moved to node 402, and then moved $X_B'$ in the x direction and $Y_B'$ in the y direction to locate the position of feature B, and so on until every feature in the model has been machined.

Figure 14:
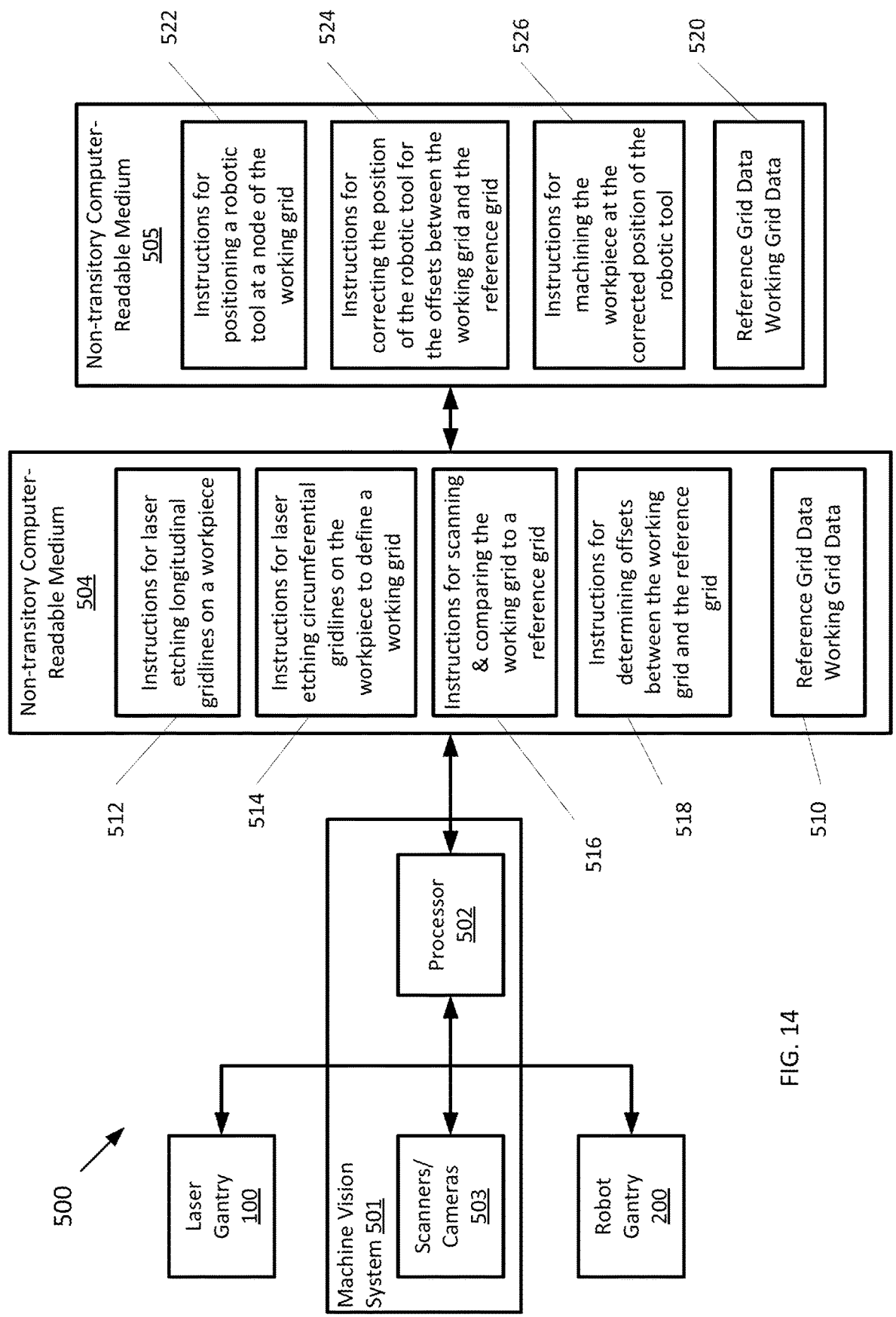
FIG. 14 is a block diagram illustrating an example system for laser etching and robotic machining.

FIG. 14 is a system block diagram of an example system 500 for laser etching and robotic machining according to the present disclosure. Example system 500 includes laser gantry 100 and robot gantry 200 described in detail above. System 500 also includes a machine vision system 501 containing a processor 502 to control laser gantry 100 and robot gantry 200, and scanners/cameras 503 for positioning laser gantry 100 and robot gantry 200. Processor 502 may be any type of general purpose or special purpose processor, or multiple processors suitable for machine vision and robotic control applications.

System 500 also includes non-transitory computer-readable medium (CRM) 504 and non-transitory CRM 505 for storing data and instructions that can be executed by processor 502. CRM 504 and CRM 505 may be any type of non-transitory memory, such as random access memory (RAM), read only memory (ROM), flash memory, and programmable read only memory (PROM), for example. In one example, CRM 504 includes a data module 510 for storing grid data, such as data for reference grid 300 in a model of workpiece 107, and data for the working grid 400 after it is scanned by machine vision system 501. In one example, CRM 504 also includes: instructions 512 for etching longitudinal lines on a workpiece, such as workpiece 107, with lasers such as lasers 102 in laser gantry 100; instructions 514 for laser etching circumferential lines on the workpiece, with lasers such as lasers 104 in laser gantry 100 to create a working grid such as working grid 400; instructions 516 for scanning the working grid and comparing the working grid to the reference grid; and instructions 518 for determining offsets between the working grid and the reference grid.

In one example, CRM 505 may include a data module 520 for storing grid data, such as data for reference grid 300 in a model of workpiece 107, and data for the working grid 400 after it is scanned by machine vision system 501. In one example, CRM 504 also includes: instructions 522 for positioning a robotic tool, such as tool head 204 on robot arm 202 of robot gantry 200, at a node of a working grid, such as working grid 400; instructions 524 for correcting the position of the robotic tool for the offsets between the working grid and the reference grid; and instructions 526 for machining the workpiece at the corrected \position of the robotic tool.

Figure 15:
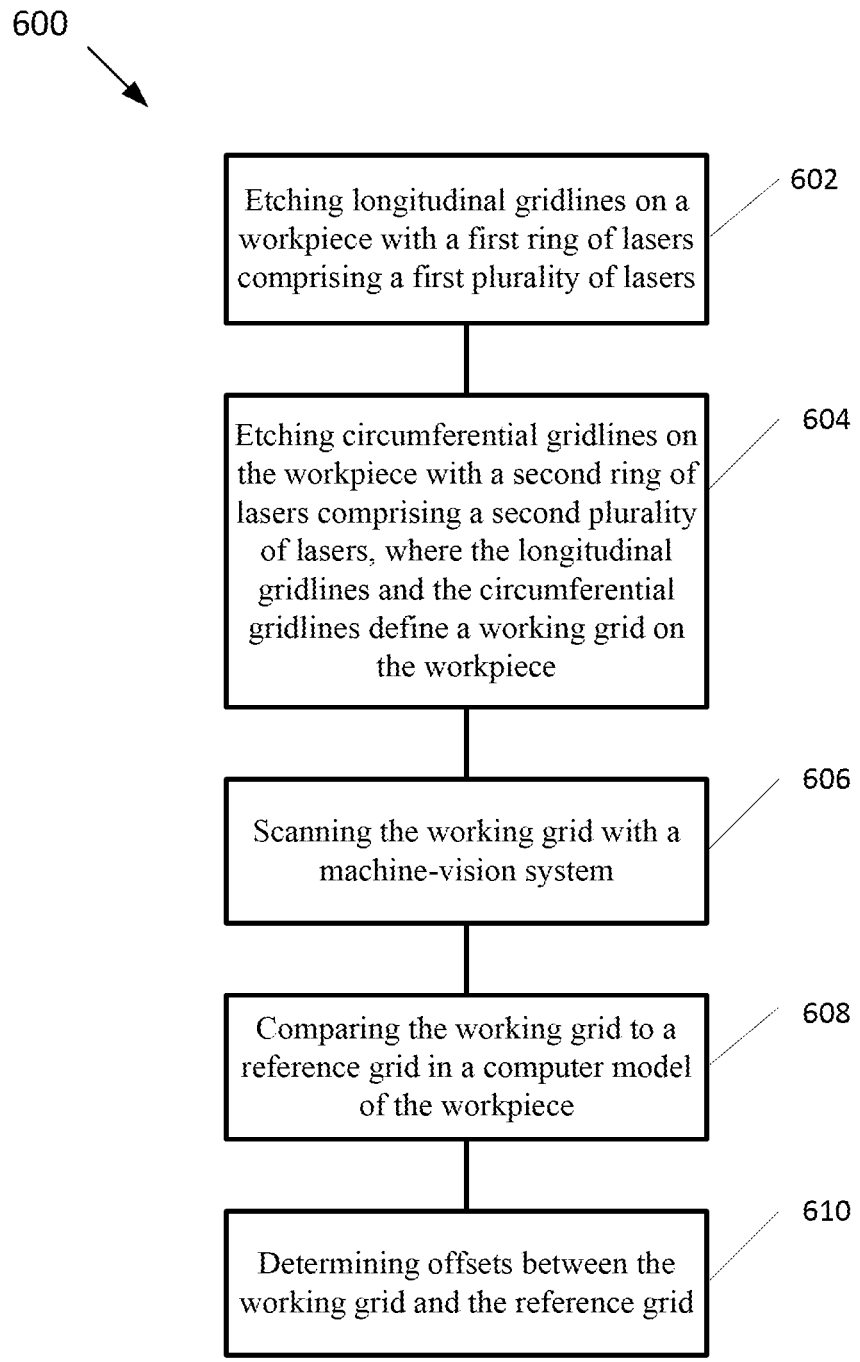
FIG. 15 is a flowchart illustrating an example method for laser etching.

FIG. 15 is a flowchart illustrating an example method 600 for laser etching according to the present disclosure. Method 600 begins at operation 602, by etching longitudinal gridlines on a workpiece (e.g., workpiece 107) with a first ring of lasers (e.g., ring 101) comprising a first plurality of lasers (e.g., lasers 102). Method 600 continues at operation 604 by etching circumferential gridlines on the workpiece with a second ring of lasers (e.g., ring 103) comprising a second plurality of lasers (e.g., lasers 104), wherein the longitudinal gridlines and the circumferential gridlines define a working grid (e.g., working grid 400) on the workpiece; Next, at operation 606, method 600 continues by scanning the working grid with a machine-vision system (e.g., machine vision system 501). Method 600 continues at operation 608 by comparing the working grid to a reference grid (e.g., reference grid 300 in a computer model of the workpiece. Finally, at operation 610, method 600 concludes by determining (e.g., with machine vision system 501) offsets between the working grid and the reference grid.

Figure 16:
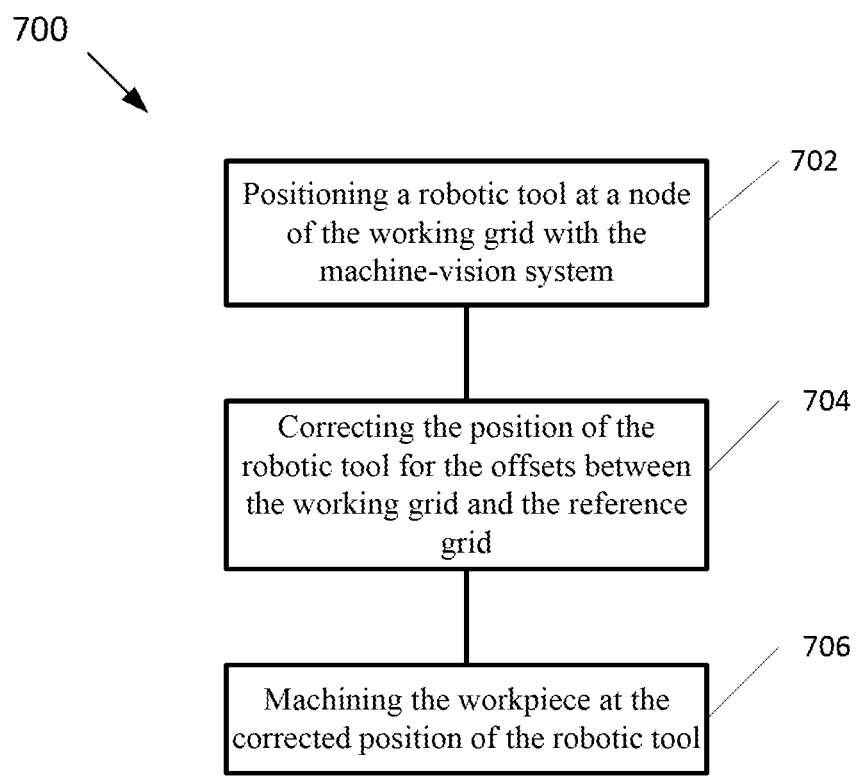
FIG. 16 is a flowchart illustrating an example method for robotic machining.

FIG. 16 is a flowchart illustrating an example method 700 for robotic machining of a workpiece after the workpiece has been laser etched with a working grid by the example system 500 using the example method 600. Method 700 begins at operation 702 by positioning a robotic tool (e.g., robotic tool 204) at a node of the working grid (e.g., working grid 400) with the machine-vision system (e.g., machine vision system 501). Method 700 continues at operation 704 by correcting the position of the robotic tool for the offsets (e.g., ΔX and ΔY) between the working grid and the reference grid (e.g., reference grid 300). Method 700 concludes at operation 706 by machining the workpiece at the corrected position of the robotic tool.

The preceding description sets forth numerous specific details such as examples of specific systems, components, methods, and so forth, in order to provide a thorough understanding of several examples in the present disclosure. It will be apparent to one skilled in the art that at least some examples in the present disclosure may be practiced without these specific details. In other instances, well-known components or methods are not described in detail or are presented in simple block diagram form in order to avoid unnecessarily obscuring the present disclosure. Thus, the specific details set forth are merely exemplary. While this specification contains many specific implementation details, these should not be construed as limitations on the scope of the disclosure or of what may be claimed, but rather as descriptions of features specific to particular examples. Certain features that are described in this specification in the context of separate examples can also be implemented in combination in a single example. Conversely, various features that are described in the context of a single example can also be implemented in multiple examples separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Moreover, the separation of various system components in the examples described above should not be understood as requiring such separation in all examples. Particular examples may vary from these exemplary details and still be contemplated to be within the scope of the present disclosure.

Reference throughout this specification to "one example" or "an example" means that a particular feature, structure, or characteristic described in connection with the examples is included in at least one example. Thus, the appearances of the phrase "in one example" or "in an example" in various places throughout this specification are not necessarily all referring to the same example. In addition, the term "or" is intended to mean an inclusive "or" rather than an exclusive "or." In addition, the articles "a" and "an" as used in this application and the appended claims should generally be construed to mean "at least one" unless specified otherwise or clear from context to be directed to a singular form. Furthermore, the terms "first," "second," "third," etc., as used herein, are meant as labels to distinguish among different elements and may not necessarily have an ordinal meaning according to their numerical designation.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent or alternating manner.

The above description of illustrated implementations, including what is described in the Abstract, is not intended to be exhaustive or to limit the scope of the disclosure to the precise forms disclosed. While specific implementations and examples are described herein for illustrative purposes, various equivalent modifications are possible within the scope of the present disclosure, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

What is claimed is:

1. A system, comprising:
   a first ring of lasers, comprising a first plurality of lasers, configured to etch longitudinal gridlines on a workpiece;
   a second ring of lasers, comprising a second plurality of lasers, configured to etch circumferential gridlines on the workpiece, wherein the longitudinal gridlines and the circumferential gridlines define a working grid on the workpiece; and
   a machine vision system to scan the working grid and compare the working grid to a reference grid in a computer model of the workpiece, and to determine offsets between the working grid and the reference grid.

2. The system of claim 1, wherein each of the first plurality of lasers and each of the second plurality of lasers comprises a distance sensing and focusing system to focus each laser on the workpiece.

3. The system of claim 1, further comprising a rail system to support and position the first ring of lasers and the second ring of lasers with respect to the workpiece.

4. The system of claim 1, wherein the second ring of lasers is configured to rotate with respect to the first ring of lasers and with respect to the workpiece, to etch the circumferential gridlines.

5. The system of claim 1, wherein an origin of the working grid is indexed to a datum of the workpiece.

6. The system of claim 1, wherein an origin of the working grid is indexed to the reference grid.

7. The system of claim 3, further comprising a robotic drive system coupled with the machine vision system and the rail system to translate the first ring of lasers and the second ring of lasers with respect to the workpiece, and to rotate the second ring of lasers with respect to the first ring of lasers and the workpiece.

8. The system of claim 1, further comprising a robotic tool coupled with the machine vision system, to perform machining operations on the workpiece based on the offsets between the working grid and the reference grid.

9. The system of claim 1, further comprising a gantry to support the workpiece and the rail system.

10. The system of claim 7, wherein the working grid comprises a plurality of grid cells, wherein the second ring of lasers and the robotic drive are configured to etch a location code in each of the plurality of grid cells.

11. A method, comprising:
   etching longitudinal gridlines on a workpiece with a first ring of lasers comprising a first plurality of lasers;
   etching circumferential gridlines on the workpiece with a second ring of lasers comprising a second plurality of lasers, wherein the longitudinal gridlines and the circumferential gridlines define a working grid on the workpiece;
   scanning the working grid with a machine-vision system;
   comparing the working grid to a reference grid in a computer model of the workpiece; and
   determining offsets between the working grid and the reference grid.

12. The method of claim 11, further comprising:
   detecting a distance between the workpiece and each laser in the first ring of lasers and the second ring of lasers; and
   focusing each laser in the first ring of lasers and the second ring of lasers on the workpiece.

13. The method of claim 11, wherein,
   etching the longitudinal gridlines comprises traversing the workpiece with the first ring of lasers on a rail system with a robotic drive, and wherein
   etching the circumferential gridlines comprises rotating the second ring of lasers around the workpiece with the robotic drive.

14. The method of claim 11, further comprising indexing the working grid to the reference grid.

15. The method of claim 11, further comprising indexing the working grid to a datum of the workpiece.

16. The method of claim 11, comprising:
   positioning a robotic tool at a node of the working grid with the machine-vision system;
   correcting the position of the robotic tool for the offsets between the working grid and the reference grid; and
   machining the workpiece at the corrected position of the robotic tool.

17. The method of claim 13, wherein the working grid comprises a plurality of grid cells, the method further comprising:
   positioning the second ring of lasers with the machine vision system and the robotic drive; and
   etching a location code in each of the plurality of grid cells with the second ring of lasers.

18. The method of claim 17, further comprising:
   reading the location code of a selected grid cell with the machine vision system;
   positioning a robotic tool in the selected grid cell;
   correcting the positioning of the robotic tool for the offsets between the working grid and the reference grid; and
   machining the workpiece at the corrected position of the robotic tool.

19. An apparatus, comprising a non-transitory, computer-readable medium having instructions therein that, when executed by a processor in a laser etching system, cause the processor to control operations, comprising:

etching longitudinal gridlines on a workpiece comprising one of a cylindrical or semi-cylindrical body with a first ring of lasers comprising a first plurality of lasers;

etching circumferential gridlines on the workpiece with a second ring of lasers comprising a second plurality of lasers, wherein the longitudinal gridlines and the circumferential gridlines define a working grid on the workpiece;

scanning the working grid with a machine vision system;

comparing the working grid to a reference grid in a computer model of the workpiece; and determining offsets between the working grid and the reference grid.

20. The apparatus of claim 19, further comprising:

positioning a robotic tool at a node of the working grid with the machine-vision system;

correcting the position of the robotic tool for the offsets between the working grid and the reference grid; and machining the workpiece at the corrected position of the robotic tool.

\* \* \* \* \*